United States Patent
Niemeyer et al.

(10) Patent No.: US 11,994,077 B2
(45) Date of Patent: May 28, 2024

(54) FUEL NOZZLE METERING VALVE THAT PROVIDES DRIBBLE FLOW AND RELATED METHOD

(71) Applicants: Sander G. Niemeyer, Grand Rapids, MI (US); Deke R. Pyle, Zeeland, MI (US)

(72) Inventors: Sander G. Niemeyer, Grand Rapids, MI (US); Deke R. Pyle, Zeeland, MI (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/749,924

(22) Filed: May 20, 2022

(65) Prior Publication Data
US 2023/0374946 A1    Nov. 23, 2023

(51) Int. Cl.
*F16K 11/07* (2006.01)
*F02C 7/232* (2006.01)
*F02C 9/26* (2006.01)

(52) U.S. Cl.
CPC .............. *F02C 9/263* (2013.01); *F02C 7/232* (2013.01); *F16K 11/0716* (2013.01); *F05D 2240/35* (2013.01)

(58) Field of Classification Search
CPC .......... F20C 9/263; F20C 7/232; F16K 3/267; F16K 15/026; F05D 2240/35; F02M 63/0042
See application file for complete search history.

(56) References Cited

U.S. PATENT DOCUMENTS

| | | | |
|---|---|---|---|
| 3,339,574 A | 9/1967 | Erb et al. | |
| 5,809,771 A | 9/1998 | Wernberg | |
| 8,393,156 B2 | 3/2013 | Niemeyer et al. | |
| 8,650,880 B1* | 2/2014 | Jansen | F23R 3/28 60/725 |
| 2004/0062660 A1* | 4/2004 | Kazahaya | F04B 49/22 417/222.1 |
| 2011/0107768 A1 | 5/2011 | Niemeyer et al. | |
| 2016/0017808 A1* | 1/2016 | Chabaille | F02C 7/22 60/740 |
| 2018/0163630 A1* | 6/2018 | Bickley | F23K 5/06 |
| 2018/0258864 A1* | 9/2018 | Marocchini | F16K 3/243 |

* cited by examiner

*Primary Examiner* — Kelsey E Cary
(74) *Attorney, Agent, or Firm* — Reinhart Boerner Van Deuren P.C.

(57) ABSTRACT

Embodiments of a metering valve for a fuel nozzle are disclosed. The metering valve includes a fitting having an interior cavity and an inlet, a liner disposed within the interior cavity, and a spool having an orifice. The liner includes inlet ports, and the spool is disposed within the liner. The spool is configured to slide within the liner to control flow between the inlet and the orifice. The spool has an open position in which the spool uncovers the inlet ports, a closed position in which the spool is seated against the fitting, and a lifted off position in which the spool is not seated against the fitting and covers the inlet ports. A dribble flow path through at least one of the spool or the liner provides fluid communication between the inlet and the orifice when the spool is in the lifted off position.

20 Claims, 12 Drawing Sheets

FUEL NOZZLE METERING VALVE THAT PROVIDES DRIBBLE FLOW AND RELATED METHOD

FIELD OF THE INVENTION

This invention generally relates to fuel nozzles and, in particular, to a metering valve for fuel nozzles.

BACKGROUND OF THE INVENTION

In many aircraft, fuel nozzles provide fuel to a combustion chamber of a combustion engine. At low engine speeds, such as between ignition and idle, pressure drop across the nozzle is low, which makes maintaining fuel flow into the combustion chamber comparatively more difficult than at high engine speeds where pressure drop across the nozzle is high. If fuel flow into the combustion chamber is not maintained, the engine may flame out, requiring restart.

A metering valve may be used within the fuel nozzle to protect against pressure variation in the fuel nozzle at low flows, but at ignition, the metering valve is seated such that the fuel does not flow through the nozzle. Upon ignition and until reaching idle, the fuel pressure must build enough such that the metering valve opens to permit fuel flow through the nozzle into the combustion chamber. In that interim, however, the possibility of flame out exists because of low flow into the combustion chamber.

BRIEF SUMMARY OF THE INVENTION

Embodiments of the present disclosure relate to a metering valve that provides dribble flow through the fuel nozzle before the metering valve opens. In this way, the possibility of flame out because of a lack of fuel to the combustion chamber is substantially decreased or eliminated. These and other advantages of the disclosed metering valve, as well as additional inventive features, will be apparent from the description provided herein.

In one aspect, embodiments of the disclosure relate to a metering valve for a fuel nozzle are disclosed. The metering valve includes a fitting having an interior cavity and an inlet, a liner disposed within the interior cavity, and a spool having an orifice. The liner includes one or more inlet ports, and the spool is disposed within the liner. The spool is configured to slide within the liner to control flow between the inlet and the orifice. The spool has an open position in which the spool uncovers the one or more inlet ports, a closed position in which the spool is seated against the fitting, and a lifted off position in which the spool is not seated against the fitting and covers the inlet ports. A dribble flow path through at least one of the spool or the liner provides fluid communication between the inlet and the orifice when the spool is in the lifted off position.

In one or more embodiments of the metering valve, the dribble flow path may be a clearance between the liner and the spool in a region between the one or more inlet ports and the inlet. In one or more such embodiments, the clearance may be created by a reduced diameter of the spool. In one or more other such embodiments, the clearance is created by a thinning of the liner in the region between the one or more inlet ports and the inlet.

In one or more embodiments of the metering valve, the liner includes an abutment region that contacts the fitting in a region between the one or more inlet ports and the inlet. In such embodiments, the dribble flow path may extend from an interior surface of the liner through the abutment region to an exterior peripheral chamber between the fitting and liner that is downstream of the one or more inlet ports.

In one or more embodiments of the metering valve, the spool includes a spool head, a spool body, and a spool neck disposed between the spool head and the spool body. The spool head includes a spool face. In the closed position, the spool face abuts the fitting, and the spool head is disposed between the inlet and the one or more inlet ports. In such embodiments, the dribble flow path may extend from the spool face through a thickness of the spool head such that the dribble flow path outlets into a peripheral chamber formed between the spool neck and the liner. Further, in one or more such embodiments, the dribble flow path may be located proximal to a peripheral edge of the spool head. In one or more other such embodiments, the dribble flow path may be formed in a peripheral edge of the spool head. Further, in one or more embodiments, the fitting has a first interior surface and a second interior surface. The first interior surface and the second interior surface define the interior cavity. The second interior surface defines a seal groove in which a seal is seated. The seal engages the spool face in the closed position, and the dribble flow path is positioned in alignment with the seal or such that the seal is between the inlet and the dribble flow path in the closed position.

In another aspect, embodiments of the disclosure relate to a fuel nozzle. The fuel nozzle includes a metering valve as described according to the foregoing embodiments and a spring that biases the spool to the closed position. The spring has a first end and a second end, and the first end of the spring being seated within a spring cavity formed in the spool. The fitting of the metering valve forms a spring support, and the second end of the spring contacting the spring support. Further, the fitting of the metering valve further includes a nozzle section having a central passage in fluid communication with the orifice of the spool.

In one or more such embodiments of the fuel nozzle, the spool includes a spool head, a spool body, and a spool neck disposed between the spool head and the spool body. The dribble flow path flows either through the thickness of the spool head or around the spool head from the inlet to a peripheral chamber formed between the spool neck and the liner.

In still another aspect, embodiments of the disclosure relate to a method of increasing fuel flow through a metering valve of a fuel nozzle. The metering valve includes a fitting, a liner disposed in the fitting, and a spool slidably disposed in the liner. In the method, fuel flows through the metering valve from an inlet of the fitting to an orifice of the spool when the spool is positioned in the liner in a lifted off position that is between an open position and a closed position. In the open position, the spool uncovers one or more inlet ports of the liner, and in the closed position, the spool is seated against the fitting.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present disclosure relates to a metering valve for a fuel nozzle in which the metering valve permits dribble flow through the fuel nozzle when the metering valve is unseated and before the metering valve opens. In particular, the inventors expect the dribble flow to substantially reduce or eliminate the possibility of flameout in a combustion engine in the time between ignition and idle. Embodiments of the metering valve include a spool that slides within a liner, and the position of the spool within the liner determines whether the metering valve is open or closed. As will be discussed more fully below, the dribble flow allows some fuel to flow between the spool and liner before the metering valve opens, thereby increasing nozzle flow at low pressure drops across the metering valve. These and other aspects and advantages of various embodiments of a dribble flow path are described below and shown in the figures. The embodiments are presented by way of illustration and not by way of limitation.

Figure 1:
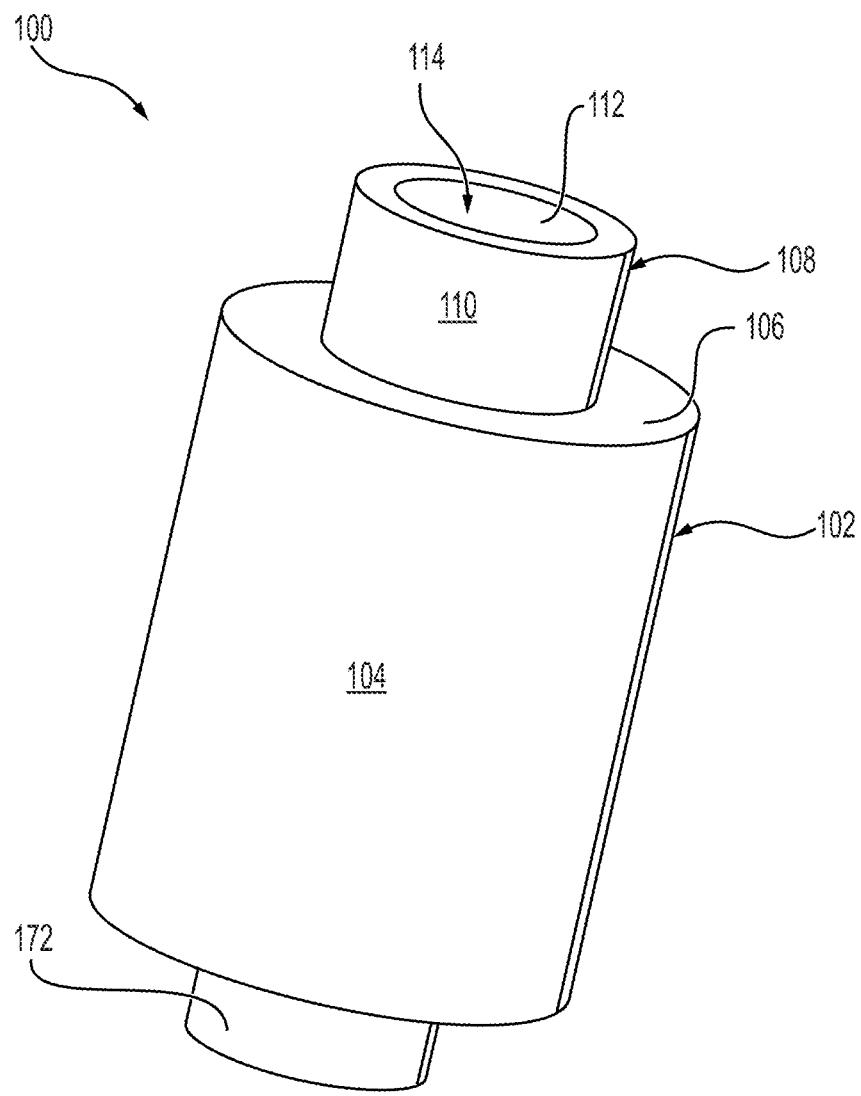
FIG. 1 is a perspective view of a metering valve of a fuel nozzle, according to an exemplary embodiment.

FIG. 1 depicts an embodiment of a metering valve 100 for a fuel nozzle. In the embodiment depicted, the metering valve 100 includes a fitting 102 having a first exterior surface 104, a second exterior surface 106, and a coupling 108 extending from the second exterior surface 106. In the embodiment depicted, the first exterior surface 104 defines a cylindrical surface of the fitting 102, and the second exterior surface 106 is substantially perpendicular to the first exterior surface 104. In one or more other embodiments, the first exterior surface 104 may define other shapes for the fitting 102, and in one or more other embodiments, the second exterior surface 106 may intersect with the first exterior surface 104 at other angles than perpendicular, including tapering to the coupling 108. With respect to the embodiment depicted, the coupling 108 extends substantially perpendicularly from the second exterior surface 106, and the coupling 108 has an exterior coupling surface 110 and an interior coupling surface 112. The exterior coupling surface 110 and the interior coupling surface 112 define a hollow cylindrical shape of the coupling 108, which provides an inlet 114 for the metering valve 100. In one or more embodiments, the fitting 102 and coupling 108 are a unitary part formed or machined from the same material, and in one or more other embodiments, the fitting 102 and coupling 108 are separate parts that are joined together permanently (e.g., by welding or adhesive bonding) or reversibly (e.g., by threaded connection). Further, in one or more embodiments, the coupling 108 includes features, such as threads, barbs, quick connect rings, etc., for coupling the metering valve 100 to a fuel source.

Figure 2:
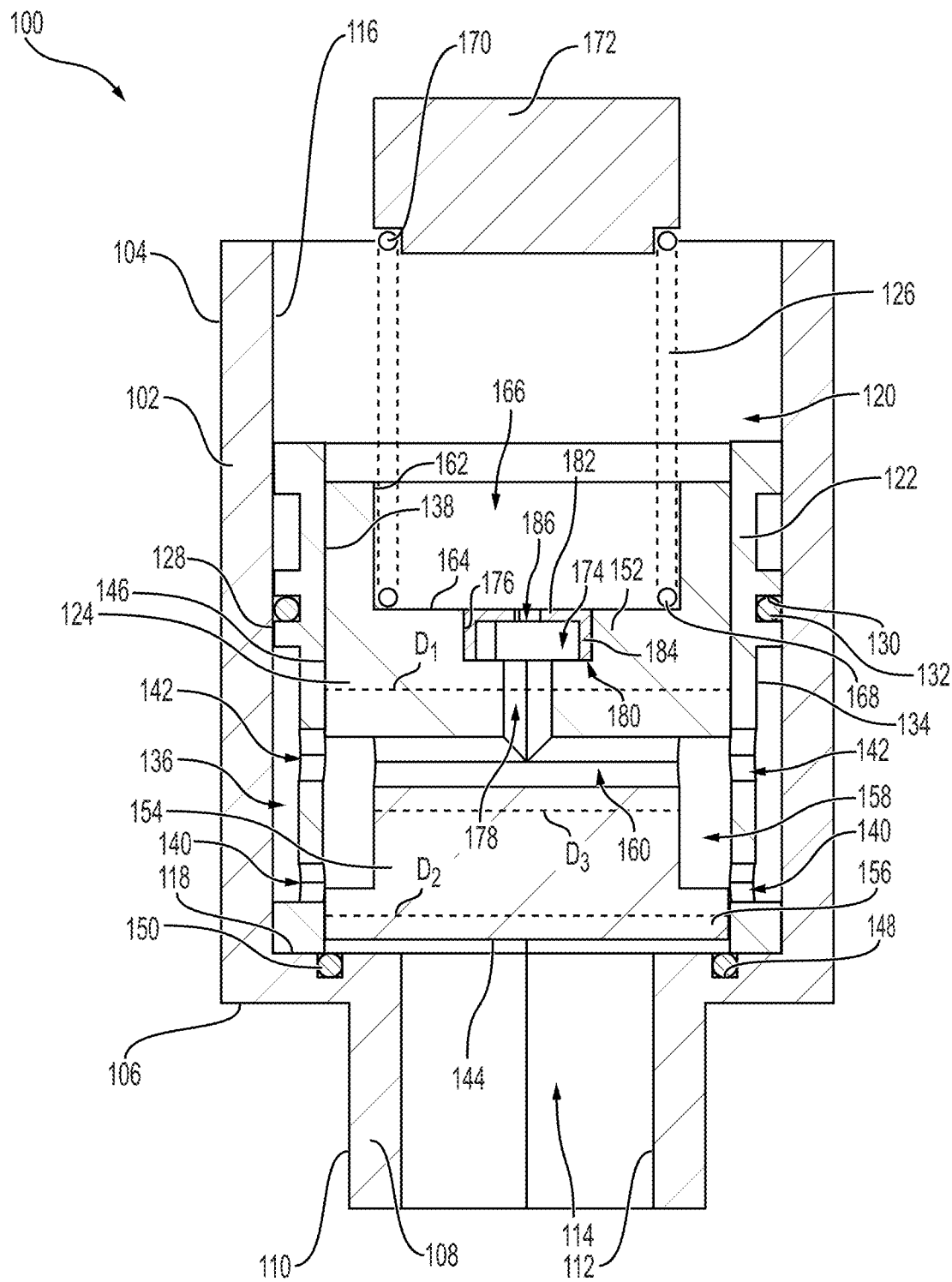
FIG. 2 is a cross-sectional view of the metering valve of FIG. 1 with a spool in a lifted off position, according to an exemplary embodiment.

FIG. 2 depicts a cross-sectional view of the metering valve 100 of FIG. 1. As can be seen in FIG. 2, the fitting 102 has a first interior surface 116 and a second interior surface 118. The first interior surface 116 is spatially disposed from the first exterior surface 104, and the second interior surface 118 is spatially disposed from the second exterior surface 106. The first interior surface 116 and the second interior surface 118 define an interior cavity 120 of the fitting 102. The interior coupling surface 112 intersects the second interior surface 118 such that the inlet 114 is in fluid communication with the interior cavity 120. Disposed within the interior cavity 120 are a liner 122, a spool 124, and a spring 126.

The liner 122 is inserted into the cavity 120 and abuts the second interior surface 118. Further, the liner 122 has an exterior liner surface 128 that engages, at least in part, the first interior surface 116 of the fitting 102. In one or more embodiments, including the depicted embodiment, the exterior liner surface 128 defines a liner seal groove 130 having a liner seal 132 seated therein. The liner seal 132 substantially prevents fuel from flowing between the liner 122 and the first interior surface 116 of the fitting 102. The exterior liner surface 128 also defines a peripheral depression 134 that creates an outer peripheral chamber 136 between the liner 122 and the first interior surface 116 of the fitting 102. The liner 122 further includes an interior liner surface 138. One or more inlet ports 140 and one or more outlet ports 142 are formed through the thickness of the liner 122 from the exterior liner surface 128 to the interior liner surface 138 to provide fluid communication from the inlet 114 to the outer peripheral chamber 136.

The flow of fuel between the inlet 114 and the outer peripheral chamber 136 is controlled by the spool 124. The spool 124 includes a spool face 144 oriented toward the inlet 114 and an exterior spool surface 146 that engages, at least in part, the interior liner surface 138. When fuel flows through the inlet 114, pressure is applied to the spool face 144, which causes the spool 124 to translate within the liner 122 such that the exterior spool surface 146 slides over the interior liner surface 138. In a closed position, the spool face 144 abuts the second interior surface 118 of the fitting 102. To prevent flow, a spool seal groove 148 may be formed in the second interior surface 118, and a spool seal 150 may be seated therein. When the spool face 144 abuts the second interior surface 118, the spool seal 150 engages the spool face 144 and prevents fuel from flowing between the second interior surface 118 and the spool face 144. As shown in FIG. 2, the spool seal groove 148 and the spool seal 150 may be positioned such that the spool seal 150 is at least partially held in place by the liner 122.

The spool 124 includes a spool body 152, a spool neck 154, and a spool head 156. The spool body 152 has a first diameter $D_1$, and the spool head 156 has a second diameter $D_2$ that is less than or equal to the first diameter $D_1$. The spook neck 154 has a third diameter $D_3$ that is less than both the first diameter $D_1$ and the second diameter $D_2$. The first diameter $D_1$ of the spool body 152 is substantially equal to the inner diameter defined by the interior liner surface 138 such that fluidtight engagement is provided between the spool 124 and the liner 122.

The second diameter $D_2$ may be the same as the first diameter $D_1$ or less than the first diameter $D_1$. In embodiments in which the second diameter $D_2$ is the same as the first diameter $D_1$, the spool head 156 also provides a fluidtight engagement with the interior liner surface 138. In embodiments in which the second diameter $D_2$ is less than the first diameter $D_1$, the spool head 156 provides a first form of dribble flow, which will be discussed in more detail below, after the spool face 144 has lifted off from the second interior surface 118.

The third diameter $D_3$ of the spool neck 154 is less than both of the first diameter $D_1$ of the spool body 152 and the second diameter $D_2$ of the spool head 156 so as to create an inner peripheral chamber 158 between the spool neck 154 and the interior liner surface 138. Depending on the position of the spool 124, fuel may flow from the inlet 114 through the one or more inlet ports 140 into the outer peripheral chamber 136 and from the outer peripheral chamber 136 through the one or more outlet ports 142 into the inner peripheral chamber 158. Further, in the spool neck 154, a first bore 160 extends across the diameter of the spool neck 154, and the first bore 160 is in fluid communication with the inner peripheral chamber 158.

Figure 11:
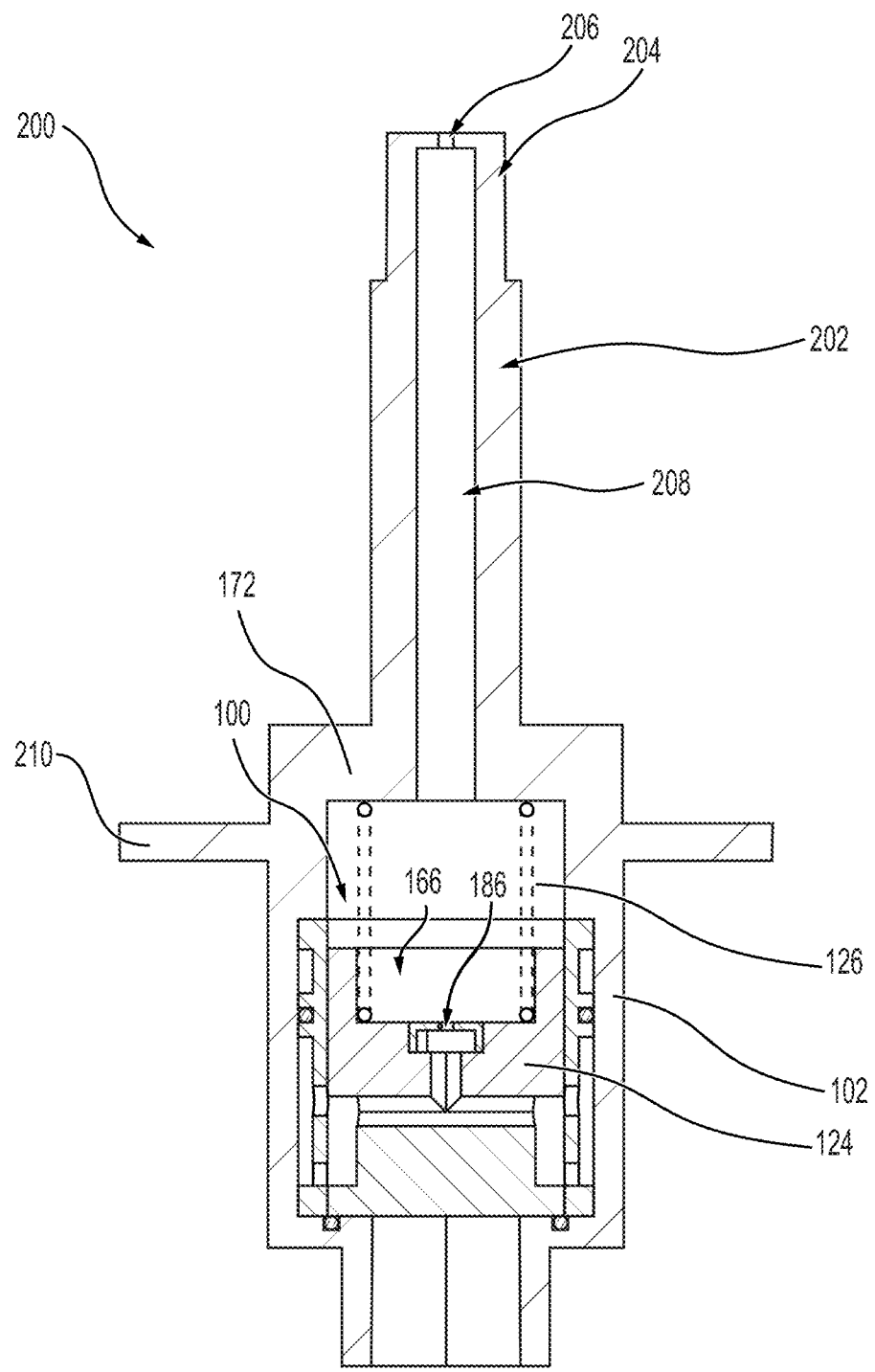
FIG. 11 is a cross-sectional view of a fuel nozzle including a metering valve, according to an exemplary embodiment.

The spool body 152 has a first interior spool surface 162 and a second interior spool surface 164. The first interior spool surface 162 is spatial disposed from and substantially parallel to the exterior spool surface 146, and the first interior spool surface 162 is substantially perpendicular to the second interior spool surface 164. The first interior spool surface 162 and the second interior spool surface 164 define a spring cavity 166 into which the spring 126 is seated. In particular, the spring 126 has a first end 168 and a second end 170, and the first end 168 of the spring 126 is seated within the spring cavity 166 and abuts the second interior spool surface 164. The second end 170 of the spring 126 is connected to a spring support 172. The spring support 172 is a fixed structure that is part of the larger fuel nozzle design (e.g., as shown in FIG. 11). FIG. 2 does not depict the rest of the fuel nozzle, and only a portion of the spring support 172 is depicted to facilitate discussion of the operation of the metering valve 100.

The spring 126 biases the spool 124 toward the closed position in which the spool face 144 abuts the second interior surface 118 to cut off flow from the inlet 114. When fuel pressure is high enough, the fuel pushes the spool 124 against the spring 126 such that the spring 126 compresses toward the spring support 172.

The spool body 152 includes a counterbore hole 174 with a counterbore 176 and a through hole 178. The through hole 178 intersects with the first bore 160 in the spool neck 154. An orifice insert 180 is fit into the counterbore 176. The orifice insert 180 is comprised of a plate 182 having a wall 184 extending substantially perpendicularly from a surface of the plate 182. The wall 184 engages the counterbore 176 in a tight frictional engagement. An orifice 186 is formed through the thickness of the plate 184.

Figure 3:
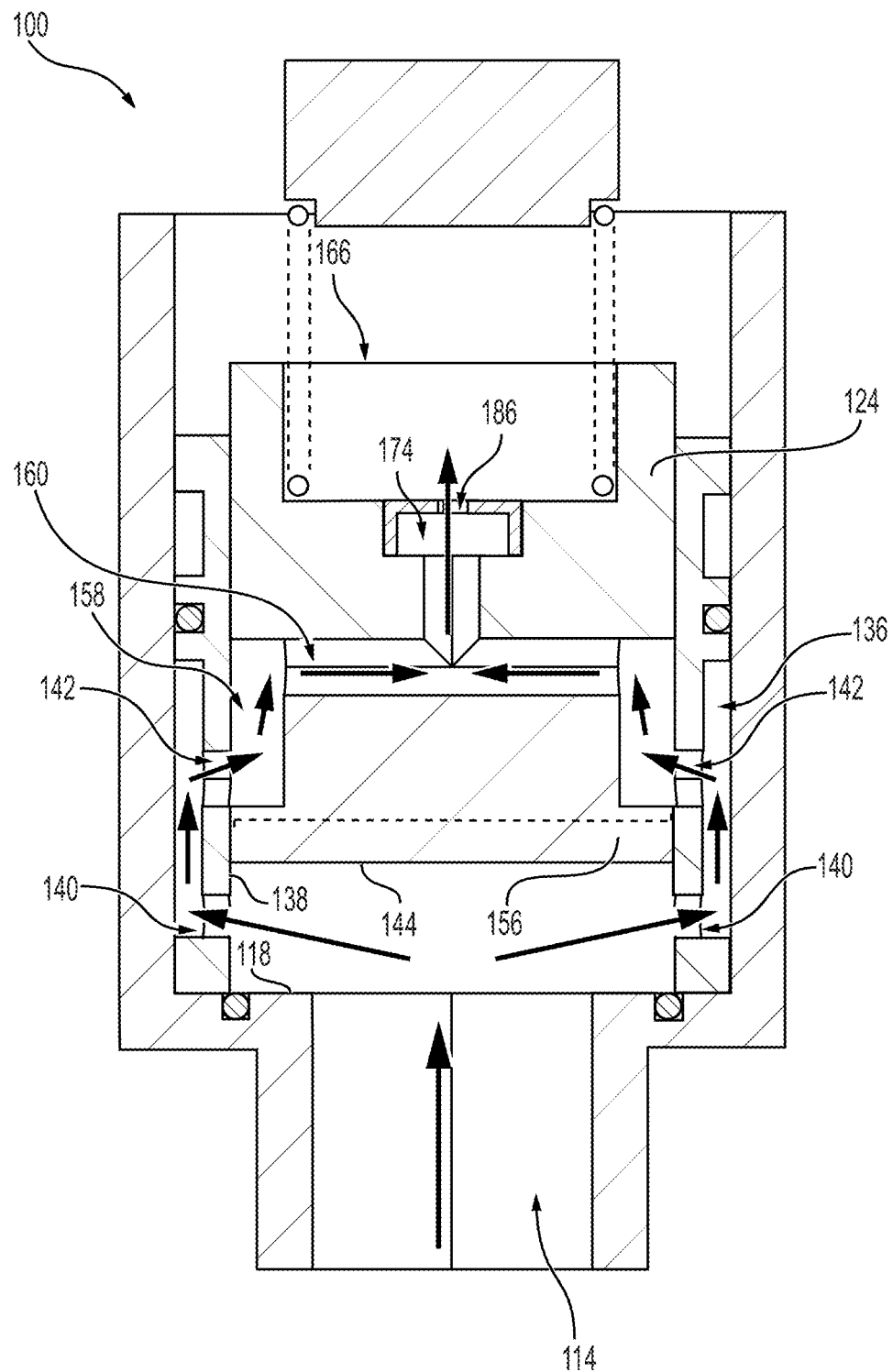
FIG. 3 is a cross-sectional view of the metering valve of FIG. 1 depicting fluid flow with the spool in the open position, according to an exemplary embodiment.

FIG. 3 depicts a fuel flow path through the metering valve 100 when the spool 124 is in an open position. As shown in FIG. 3, fuel pressure causes the spool head 156 to slide past the inlet ports 140, allowing fuel to flow from the inlet 114, through the inlet ports 140, and into the outer peripheral chamber 136. From the outer peripheral chamber 136, the fuel flows through the outlet ports 142 into the inner peripheral chamber 158, and from inner peripheral chamber 158, the fuel flows into the first bore 160, through the counterbore hole 174, and out through the orifice 186 into the spring cavity 166. Thereafter, the fuel flows out into a combustion chamber when sprayed from the fuel nozzle.

As mentioned above, the metering valve 100 is configured to provide a dribble flow from the inlet 114 to the orifice 186 when the spool face 144 lifts off from the second interior face 118 and before the spool head 156 slides past the opening of the inlet ports 140. A variety of different mechanisms can be used to create this dribble flow. As alluded to above, one mechanism for providing dribble flow is to provide a clearance between the spool head 146 and the interior liner surface 138 by sizing the second diameter $D_2$ of the spool head 146 so as to not engage the interior liner surface 138 in a fluidtight manner.

Figure 4:
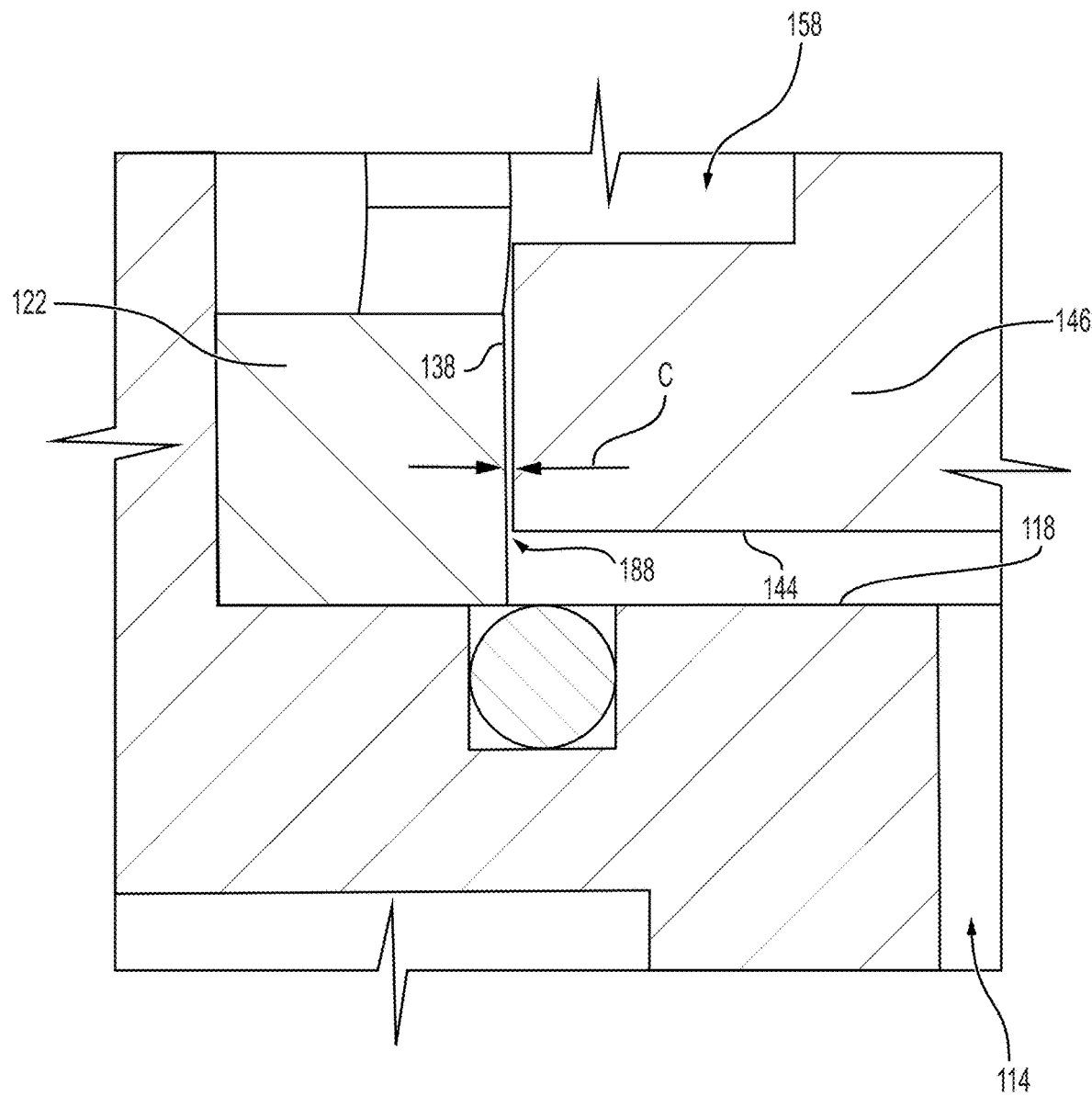
FIG. 4 is a detail view of a first dribble flow path through the metering valve, according to an exemplary embodiment.

FIG. 4 depicts a detail view of a portion of the spool head 146 and the liner 122. As can be seen, a small clearance C is provided between the spool head 146 and the interior liner surface 138 in the region between the inlet ports 140 and the inlet 114. When the spool face 144 is lifted off from the second interior surface 118 as shown in FIG. 4, fuel is able to flow from the inlet 114 through the clearance C into the inner peripheral chamber 158. In one or more embodiments, the clearance C is provided around the entire perimeter of the spool head 156. In one or more other embodiments, the clearance C is only provided partially around the perimeter of the spool head 156. Alternatively, in one or more embodiments, the liner 122 is thinned in the region below the inlet ports 140. For example, the thickness of the liner 122 between the exterior liner surface 128 and the interior liner surface 138 is less in the region below the inlet ports 140 than in the region above the inlet ports 140 (with respect to the orientation of the liner 122 shown in FIGS. 3 and 4). That is, the liner 122 is thinned in the region of the interior liner surface 138 between the inlet ports 140 and the inlet 114. Thus, the clearance C provides a dribble flow path 188 from the inlet 114 to the inner peripheral chamber 158, which is in fluid communication with the orifice 186 (as shown in FIG. 3).

Figure 5:
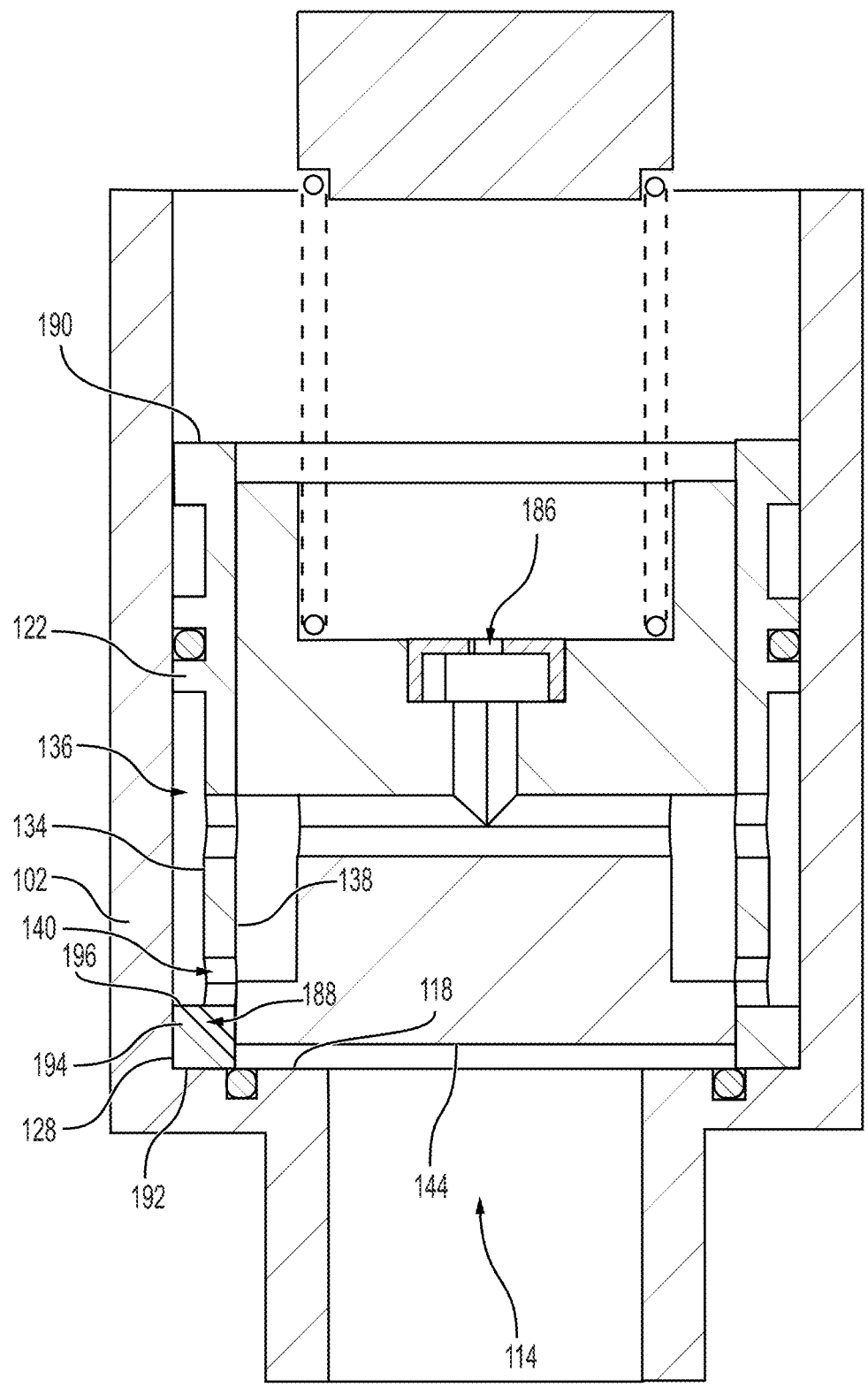
FIG. 5 is cross-sectional view of a second dribble flow path through the metering valve, according to an exemplary embodiment.

FIG. 5 depicts another embodiment of a dribble flow path 188. The liner 122 has a first end 190 and a second end 192. The second end 192 of the liner 122 abuts the second interior surface 118 of the fitting 102. At the second end 192 of the liner 122 below the inlet ports 140 is an abutment region 194 that contacts the fitting 102 in a region between the inlet ports 140 and the inlet 114. As discussed above, a peripheral depression 134 is formed in the exterior liner surface 128, creating the abutment region 194 and leaving a portion of the exterior surface 128 that abuts the first interior surface 116 of the fitting 102. The abutment region 194 has a transverse surface 196 defining, in part, the peripheral depression 134. The dribble flow path 188 is formed through the abutment region 194 from the interior liner surface 138 to the exterior peripheral chamber 136. In particular, the dribble flow path 188 outlets into the exterior peripheral chamber 136 through the transverse surface 196 of the abutment region 194. In the embodiment depicted in FIG. 5, the dribble flow path 188 extends diagonally from the interior liner surface 138 to the transverse surface 196. Further, the opening of the dribble flow path 188 on the interior liner surface 138 is proximal to the second end 192 of the liner 122 such that the opening to the dribble flow path 188 receives flow substantially as soon as the spool face 144 lifts from the second interior surface 118. In this way, the dribble flow path 188 through the abutment region 194 of the liner 122 provides a flow path between the inlet 114 and the outer peripheral chamber 136 that bypasses the inlet ports 140, thereby providing fluid communication to the orifice 186.

Figure 6:
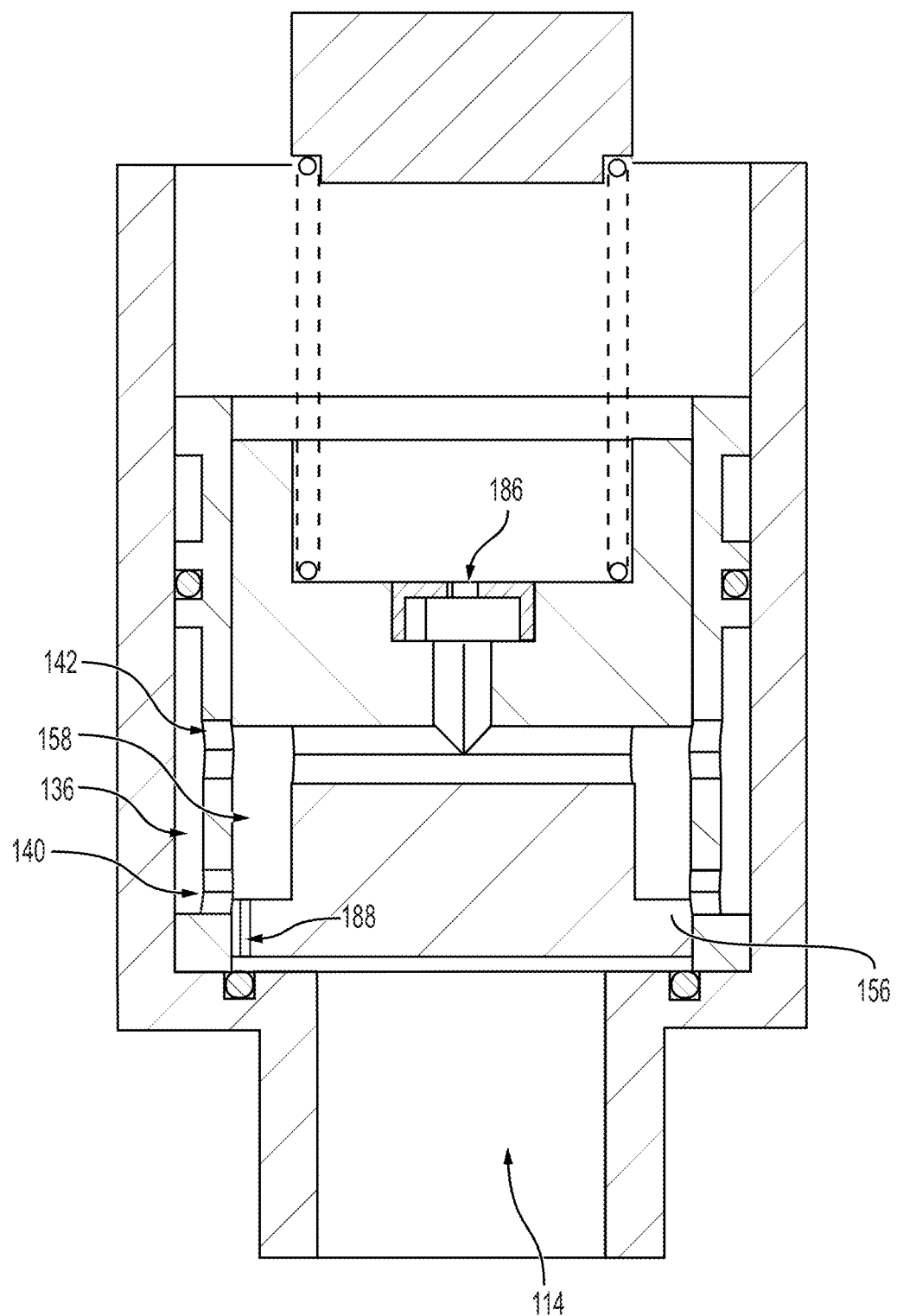
FIG. 6 is a cross-sectional view of a third dribble flow path through the metering valve, according to an exemplary embodiment.
Figure 7:
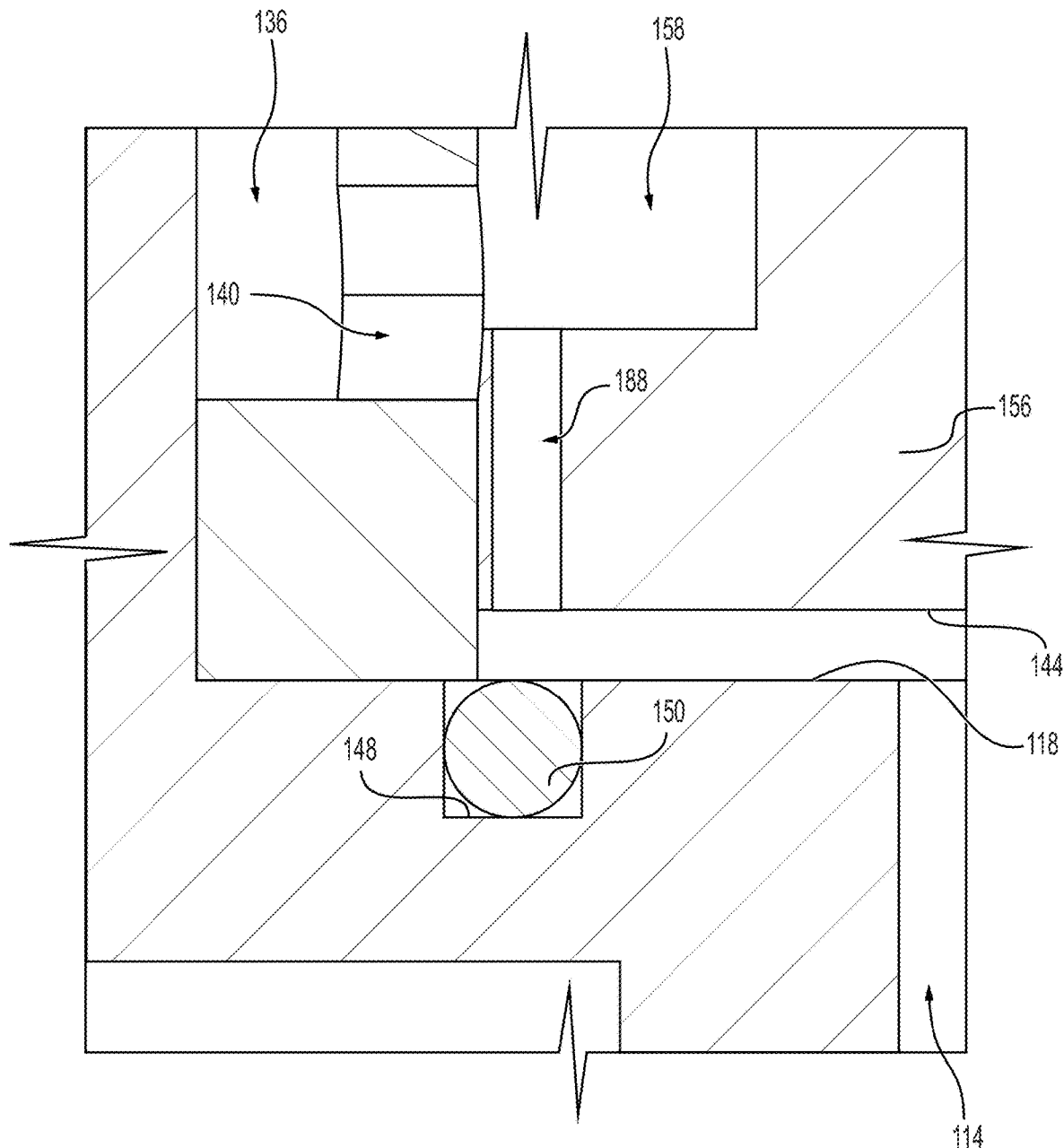
FIG. 7 is a detail view of the third dribble flow path, according to an exemplary embodiment.

FIG. 6 depicts another embodiment of a dribble flow path 188. In the embodiment of FIG. 6, the dribble flow path 188 is through the thickness of the spool head 156, providing fluid communication directly between the inlet 114 and the inner peripheral chamber 158, which is in fluid communication with the orifice 186. FIG. 7 depicts a detail view of the dribble flow path 188 in the spool head 156. As can be seen in FIG. 7, the dribble flow path 188 extends from the spool face 144 through the thickness of the spool head 156 such that flow through the dribble flow path 188 exits into the inner peripheral chamber 158. In this way, the fluid bypasses the inlet ports 140, the outer peripheral chamber 136, and the outlet ports 142 (as shown in FIG. 6) such that dribble flow is provided when the spool face 144 lifts off from the second interior surface 118. In one or more embodiments, the dribble flow path 188 is positioned proximal to a peripheral edge of the spool head 156. In one or more embodiments, the dribble flow path 188 is aligned with the spool seal 150 or positioned such that the spool seal 150 is between the inlet 114 and the dribble flow path 188 so that flow through the dribble flow path 188 is not allowed when the spool face 144 abuts the second interior surface 118.

Figure 8:
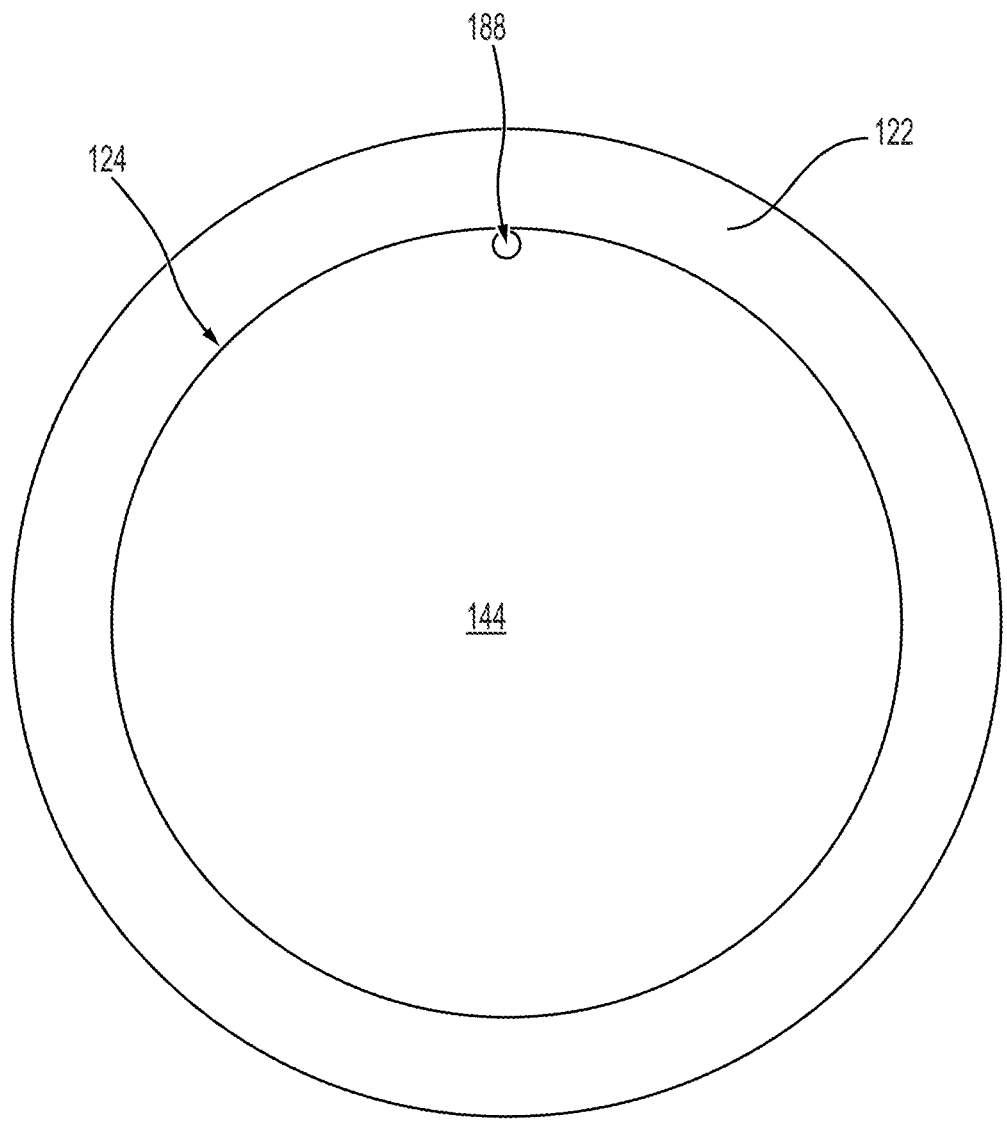
FIG. 8 is a cross-sectional view of the third dribble flow path as seen from a face of the spool, according to an exemplary embodiment.

FIG. 8 depicts a cross-sectional view of the liner 122 and spool 124 across the spool face 144. As can be seen, the spool face 144 only includes one dribble flow path 188 positioned adjacent to the edge of the spool face 114, but in one or more other embodiments, the spool face 144 may include more than one dribble flow path 188 positioned around the periphery of the spool face 144.

Figure 9:
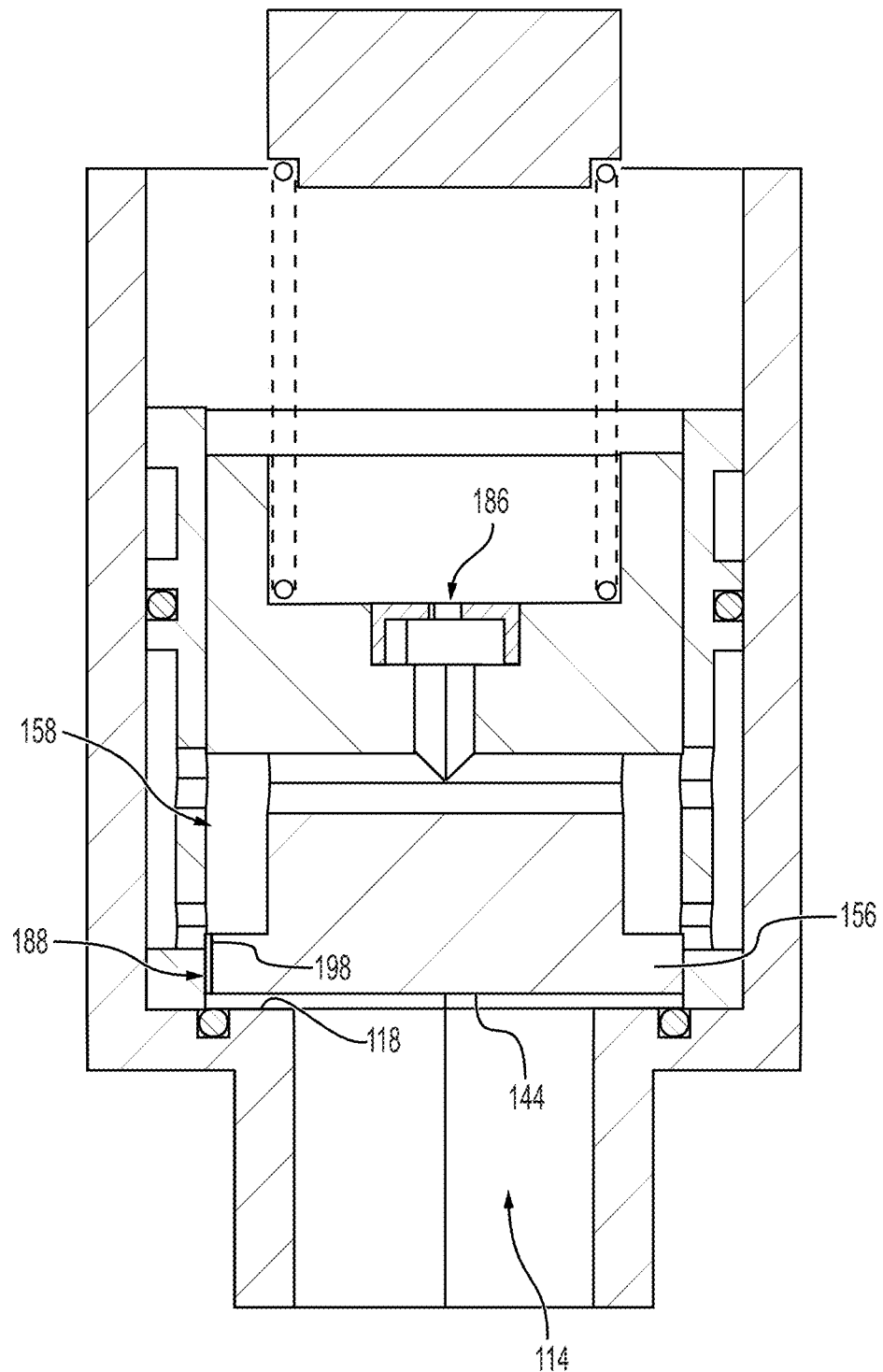
FIG. 9 is a cross-sectional view of a fourth dribble flow path through the metering valve, according to an exemplary embodiment.

FIG. 9 depicts another embodiment of a dribble flow path 188. In the embodiment of FIG. 9, the dribble flow path 188 is again through the spool head 156 but the dribble flow path is a channel 198 formed into a peripheral edge of the spool head 156. Similar to the previous embodiment, the dribble flow path 188 extends from the spool face 144 through the thickness of the spool head 156 such that flow through the dribble flow path 188 exits into the inner peripheral chamber 158, thereby providing dribble flow between the inlet 114 and the orifice 186 when the spool face 144 lifts off from the second interior surface 118.

Figure 10:
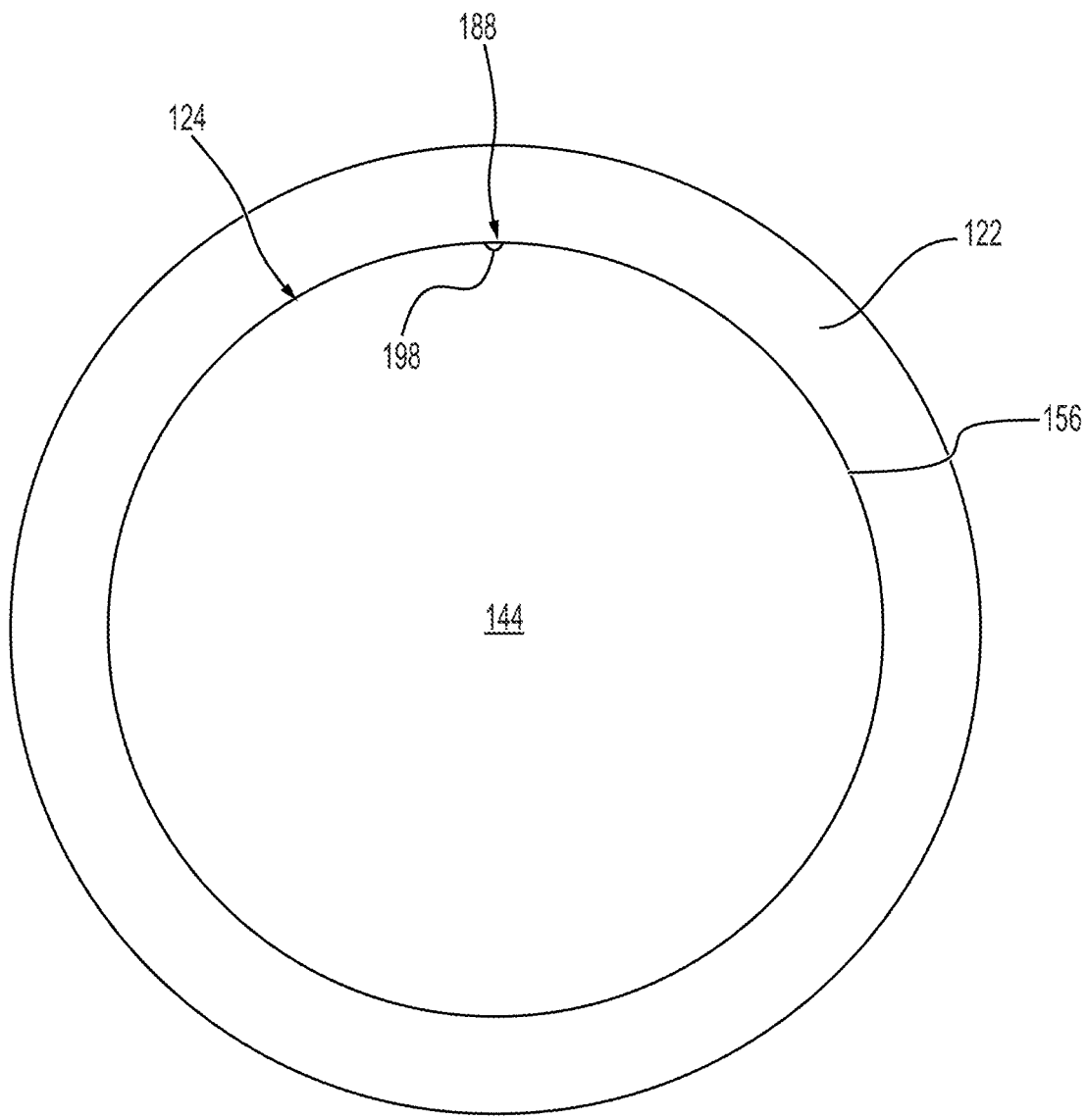
FIG. 10 is a cross-sectional view of the fourth dribble flow path as seen from a face of the spool, according to an exemplary embodiment.

FIG. 10 depicts a cross-sectional view of liner 122 and spool 124 across the spool face 144. As can be seen, the spool face 144 only includes one channel 198 formed into the peripheral edge of the spool face 114 to create the dribble flow path 188, but in one or more other embodiments, the spool face 144 may include more than one channel 198 formed into the edge of the spool face 144 such that the spool head 156 includes more than one dribble flow path 188.

FIG. 11 depicts an embodiment of a fuel nozzle 200 incorporating a metering valve 100 according to the present disclosure. The metering valve 100 can be any of the embodiments of the metering valve 100 described above. In the embodiment depicted, the fitting of 102 of the metering valve 100 extends around the metering valve 100 and forms a nozzle section 202. The nozzle section 202 has a tip 204 with an exit aperture 206 through which fuel is forced into a combustion chamber. The nozzle section 202 has an interior central passage 208 in fluid communication with the spring cavity 166. Accordingly, when fuel passes through the orifice 186 of the metering valve 100, the fuel is ejected through the interior central passage 208 and out of the exit aperture 206.

Further, in the embodiment depicted, the fitting 102 forms the spring support 172 against which the spring 126 pushes. In operation, the spring 126 is a compression spring that biases the spool 124 in the closed position. The fitting 102 also is shown holding the liner 122 into place within the fuel nozzle 200. While the fitting 102 is depicted as being of unitary construction, the fitting 102 may be made of up multiple components joined together permanently or reversibly. For example, the nozzle section 202 may be separate from the portion of the fitting surrounding the metering valve 100, and the sections may be threadably joined or bonded together. Additionally, in embodiments, the fitting 102 may include a mounting flange 210 for attaching the fuel nozzle 200 to a desired location within a combustion chamber. The mounting flange 210 may also be a separate component positioned between the nozzle section 202 and the lower portion of the fitting 102. Similarly, in embodiments in which the mounting flange 210 is a separate component, the mounting flange 210 may also be permanently or reversibly joined to the other components of the fitting 102.

Figure 12:
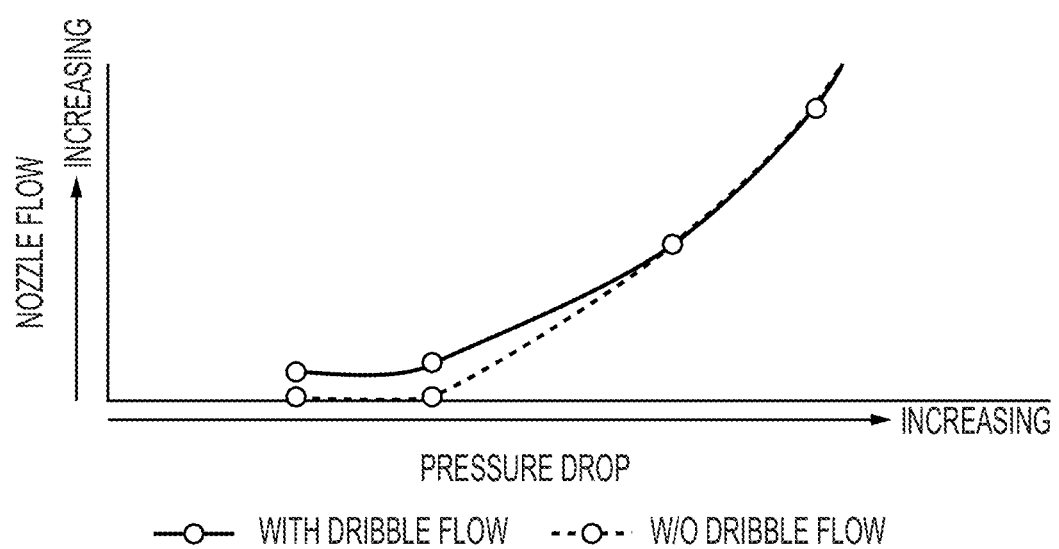
FIG. 12 is a graph of the nozzle flow as a function of pressure drop for a metering valve with dribble flow according to embodiments of the present disclosure and for a metering valve without dribble flow.

With dribble flow, the metering valve is able to produce higher nozzle flow at lower pressure drops as shown in FIG. 12. Specifically, FIG. 12 depicts the nozzle flow for a metering valve with dribble flow (e.g., according to one of the previously described embodiments) and for a metering valve without dribble flow at low pressure drops. At low levels of pressure drop across the metering valve, the inventors found that the metering valve with dribble flow is able to provide greater nozzle flow than the metering valve without dribble flow. Notwithstanding the modifications to provide dribble flow, the metering valve is not affected in the amount of nozzle flow at higher pressure drops. That is, compared to a conventional metering valve without dribble flow, the metering valve with dribble flow is able to provide higher nozzle flow at lower pressure drops and the same nozzle flow at higher pressure drops.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A metering valve for a fuel nozzle, comprising:
   a fitting having an interior cavity and an inlet;
   a liner disposed within the interior cavity, the liner comprising one or more inlet ports;
   a spool having an orifice, the spool being disposed within the liner;
   wherein the spool is configured to slide within the liner to control flow between the inlet and the orifice, the spool having an open position in which the spool uncovers the one or more inlet ports, a closed position in which the spool is seated against the fitting, and a lifted off position in which the spool is not seated against the fitting and covers the inlet ports; and
   wherein a dribble flow path through at least one of the spool or the liner provides fluid flow through the inlet and the orifice when the spool is in the lifted off position.

2. The metering valve of claim 1, wherein the dribble flow path is a clearance between the liner and the spool in a region between the one or more inlet ports and the inlet.

3. The metering valve of claim 2, wherein the clearance is created by a reduced diameter of the spool.

4. The metering valve of claim 2, wherein the clearance is created by a thinning of the liner in the region between the one or more inlet ports and the inlet.

5. The metering valve of claim 1, wherein the liner comprises an abutment region that contacts the fitting in a region between the one or more inlet ports and the inlet and wherein the dribble flow path extends from an interior surface of the liner through the abutment region to an exterior peripheral chamber between the fitting and liner that is downstream of the one or more inlet ports.

6. The metering valve of claim 1, wherein the spool comprises a spool head, a spool body, and a spool neck disposed between the spool head and the spool body;
   wherein the spool head comprises a spool face;
   wherein, in the closed position, the spool face abuts the fitting and the spool head is disposed between the inlet and the one or more inlet ports; and
   wherein the dribble flow path extends from the spool face through a thickness of the spool head such that the dribble flow path outlets into a peripheral chamber formed between the spool neck and the liner.

7. The metering valve of claim 6, wherein the dribble flow path is located proximal to a peripheral edge of the spool head.

8. The metering valve of claim 6, wherein the dribble flow path is formed in a peripheral edge of the spool head.

9. The metering valve of claim 6, wherein the fitting comprises a first interior surface and a second interior surface, the first interior surface and the second interior surface defining the interior cavity, wherein the second interior surface defines a seal groove in which a seal is seated, the seal engaging the spool face in the closed position, and wherein the dribble flow path is positioned in alignment with the seal or such that the seal is between the inlet and the dribble flow path in the closed position.

10. A fuel nozzle, comprising
    the metering valve of claim 1;
    a spring biasing the spool to the closed position, the spring having a first end and a second end and the first end of the spring being seated within a spring cavity formed in the spool;
    wherein the fitting forms a spring support, the second end of the spring contacting the spring support;
    wherein the fitting further comprises a nozzle section having a central passage in fluid communication with the orifice of the spool.

11. The fuel nozzle of claim 10, wherein the spool comprises a spool head, a spool body, and a spool neck disposed between the spool head and the spool body; and
    wherein the dribble flow path flows either through a thickness of the spool head or around the spool head from the inlet to a peripheral chamber formed between the spool neck and the liner.

12. A method of increasing fuel flow through a metering valve of a fuel nozzle, the metering valve comprising a fitting, a liner disposed in the fitting, and a spool slidably disposed in the liner, the method comprising:
    flowing fuel through the metering valve from an inlet of the fitting through an orifice of the spool when the spool is positioned in the liner in a lifted off position that is between an open position and a closed position, wherein in the open position the spool uncovers one or more inlet ports of the liner and wherein in the closed position the spool is seated against the fitting.

13. The method of claim 12, wherein flowing further comprises flowing fuel through a clearance between the liner and the spool in a region between the one or more inlet ports and the inlet.

14. The method of claim 13, wherein the clearance is created by a reduced diameter of the spool.

15. The method of claim 13, wherein the clearance is created by a thinning of the liner in the region between the one or more inlet ports and the inlet.

16. The method of claim 12, wherein the liner comprises an abutment region that contacts the fitting in a region between the one or more inlet ports and the inlet; and
    wherein flowing further comprises flowing through a dribble flow path extending from an interior surface of the liner through the abutment region to an exterior peripheral chamber between the fitting and liner that is downstream of the one or more inlet ports.

17. The method of claim 12, wherein the spool comprises a spool head, a spool body, and a spool neck disposed between the spool head and the spool body;
    wherein the spool head comprises a spool face;
    wherein, in the closed position, the spool face abuts the fitting and the spool head is disposed between the inlet and the one or more inlet ports; and wherein flowing further comprises flowing fuel through a dribble flow path extending from the spool face through a thickness of the spool head into a peripheral chamber formed between the spool neck and the liner.

18. The method of claim 17, wherein the dribble flow path is located proximal to a peripheral edge of the spool head.

19. The method of claim 17, wherein the dribble flow path is formed in a peripheral edge of the spool head.

20. The method of claim 17, wherein the fitting comprises a first interior surface and a second interior surface, the first interior surface and the second interior surface defining an interior cavity, wherein the second interior surface defines a seal groove in which a seal is seated, the seal engaging the spool face in the closed position, and wherein the dribble flow path is positioned in alignment with the seal or such that the seal is between the inlet and the dribble flow path in the closed position.

\* \* \* \* \*